(12) United States Patent
Gjerdevik et al.

(10) Patent No.: US 12,325,588 B2
(45) Date of Patent: Jun. 10, 2025

(54) METHOD FOR HANDLING MALFUNCTIONING VEHICLES ON A TRACK SYSTEM AND A STORAGE AND RETRIEVAL SYSTEM USING SUCH A METHOD

(71) Applicant: Autostore Technology AS, Nedre Vats (NO)

(72) Inventors: Øystein Gjerdevik, Skjold (NO); Ragnar Stuhaug, Skjold (NO)

(73) Assignee: AutoStore Technology AS, Nedre Vats (NO)

( * ) Notice: Subject to any disclaimer, the term of this patent is extended or adjusted under 35 U.S.C. 154(b) by 154 days.

(21) Appl. No.: 17/783,964

(22) PCT Filed: Dec. 2, 2020

(86) PCT No.: PCT/EP2020/084218
§ 371 (c)(1),
(2) Date: Jun. 9, 2022

(87) PCT Pub. No.: WO2021/115864
PCT Pub. Date: Jun. 17, 2021

(65) Prior Publication Data
US 2023/0002156 A1 Jan. 5, 2023

(30) Foreign Application Priority Data
Dec. 10, 2019 (NO) .................................. 20191462

(51) Int. Cl.
*B65G 1/04* (2006.01)
*B65G 1/06* (2006.01)
(Continued)

(52) U.S. Cl.
CPC ......... *B65G 1/0464* (2013.01); *B65G 1/0478* (2013.01); *B65G 1/0492* (2013.01);
(Continued)

(58) Field of Classification Search
CPC .... B65G 1/065; B65G 1/0492; B65G 1/0478; B65G 1/0464; B65G 1/1378; B65G 43/02;
(Continued)

(56) References Cited

U.S. PATENT DOCUMENTS 10,822,167 B2 * 11/2020 Ingram-Tedd ....... B65G 1/0464
10,882,540 B2 * 1/2021 Stadie ....................... B08B 1/12
(Continued)

FOREIGN PATENT DOCUMENTS

CN 201027091 Y 2/2008
CN 104781163 A 7/2015
(Continued)

OTHER PUBLICATIONS

Office Action issued in counterpart Vietnamese Patent Application No. 1-2022-03911 mailed on Mar. 29, 2024 (3 pages).
(Continued)

*Primary Examiner* — Huan Le
(74) *Attorney, Agent, or Firm* — Baker Botts L.L.P.

(57) ABSTRACT

A method handles malfunctioning vehicles on a track system constituting part of a storage and retrieval system configured to store a plurality of stacks of storage containers. The track system forms a grid pattern of adjacent cells. The storage and retrieval system includes a plurality of remotely operated vehicles configured to move laterally on the track system, wherein each of the plurality of remotely operated vehicles comprises driving wheels, and a control system for monitoring and controlling wirelessly movements of the plurality of remotely operated vehicles. The control system performs at least the following steps by wireless data communication: detecting an anomaly in an operational condition of a vehicle on the track system, registering the vehicle with the anomalous operational condition as a mal-
(Continued)

functioning vehicle, registering a halt position of the malfunctioning vehicle relative to the supporting track system, and setting up a two-dimensional shutdown zone on the track system. The setting up a two-dimensional shutdown zone on the track system includes a malfunctioning vehicle zone including the halt position of the malfunctioning vehicle, and an entrance zone for entry into the malfunctioning vehicle zone. The entrance zone extends between the malfunctioning vehicle zone and a location at a periphery of the track system. The control system further performs ordering the remotely operated vehicles in operation within the shutdown zone to either move out of the shutdown zone, a halt or a combination thereof, and indicating allowance of entry into the entrance zone for an external operator by at least one of: unlocking a gateway at the periphery, and producing an entry-allowed signal registrable by a human operator located at the periphery such that the human operator may enter the entrance zone through the gateway.

21 Claims, 10 Drawing Sheets

(51) Int. Cl.
*B65G 1/137* (2006.01)
*B65G 43/02* (2006.01)
*G05B 19/418* (2006.01)
*G05D 1/00* (2024.01)

(52) U.S. Cl.
CPC ............ *B65G 1/065* (2013.01); *B65G 1/1378* (2013.01); *B65G 43/02* (2013.01); *G05B 19/41895* (2013.01); *G05D 1/0287* (2013.01); *B65G 2201/0258* (2013.01); *B65G 2207/30* (2013.01); *B65G 2207/40* (2013.01)

(58) Field of Classification Search
CPC ........ B65G 2201/0258; B65G 2207/30; B65G 2207/40; G05B 19/41895; G05D 1/0287
See application file for complete search history.

(56) References Cited

U.S. PATENT DOCUMENTS

| | | | | |
|---|---|---|---|---|
| 11,174,104 | B2* | 11/2021 | Agarwal | ............... B65G 1/0492 |
| 2012/0185080 | A1 | 7/2012 | Cyrulik et al. | |
| 2015/0066283 | A1 | 3/2015 | Wurman et al. | |
| 2018/0194571 | A1 | 7/2018 | Fryer et al. | |
| 2019/0176323 | A1 | 6/2019 | Coady et al. | |

FOREIGN PATENT DOCUMENTS

| | | | |
|---|---|---|---|
| CN | 109748022 | A | 5/2019 |
| CN | 109877831 | A | 6/2019 |
| JP | 2012001346 | A | 1/2011 |
| JP | 2015535517 | A | 12/2015 |
| JP | 2016175735 | A | 10/2016 |
| JP | 2016183050 | A | 10/2016 |
| JP | 2017509564 | A | 4/2017 |
| JP | 2017524625 | A | 8/2017 |
| JP | 2019178009 | A | 10/2019 |
| NO | 317366 | B1 | 10/2004 |
| NO | 20180782 | A1 | 12/2019 |
| NO | 20190553 | A1 | 12/2019 |
| WO | 2010118412 | A1 | 10/2010 |
| WO | 2014075937 | A1 | 5/2014 |
| WO | 2014090684 | A1 | 6/2014 |
| WO | 2014145437 | A1 | 9/2014 |
| WO | 2014195901 | A1 | 12/2014 |
| WO | 2015140216 | A1 | 9/2015 |
| WO | 2015193278 | A1 | 12/2015 |
| WO | 2017148939 | A1 | 9/2017 |
| WO | 2018146304 | A1 | 8/2018 |
| WO | 2018162757 | A1 | 9/2018 |
| WO | 2019238662 | A1 | 12/2019 |

OTHER PUBLICATIONS

International Search Report issued in International Application No. PCT/EP2020/084218, mailed Feb. 24, 2021 (5 pages).
Written Opinion issued in International Application No. PCT/EP2020/084218; Dated Feb. 24, 2021 (7 pages).
Search Report issued in Norwegian Application No. 20191462; Dated Jun. 24, 2020 (2 pages).
Wichit Phardthaisong, Notification of Amendment in Thai Patent Application No. 2201003529, mailed Jul. 2, 2024, 9 pages (including translation), Thailand Patent Office, Nonthaburi, Thailand.
Rudi Hoffert, Examination Report in EP Application No. 20819687.3, mailed Sep. 5, 2024, 4 pages, European Patent Office, Rijswijk, Netherlands.
Liu Jing, Notification of First Office Action for Chinese Application No. 2020800959695, mailed Mar. 30, 2024, 16 pages, The State Intellectual Property Office of the People's Republic of China, Beijing, China.
Mari Uchida, Notice of Reasons for Rejection for Japanese Application No. 2022534719, mailed Nov. 28, 2024, 15 pages, JPO, Japan.
Hoffert, Rudi, EPO Examination Report for EPO Application No. 20819687.3 mailed Feb. 26, 2025, 7 pages, European Patent Office, Rijswijk, Netherlands.

* cited by examiner

METHOD FOR HANDLING MALFUNCTIONING VEHICLES ON A TRACK SYSTEM AND A STORAGE AND RETRIEVAL SYSTEM USING SUCH A METHOD

TECHNICAL FIELD

The present invention relates to a method for handling malfunctioning vehicles on a track system constituting part of a storage and retrieval system configured to store a plurality of stacks of storage containers, a storage and retrieval system and a control system carrying out the method.

BACKGROUND AND PRIOR ART

FIG. 1 discloses a typical prior art automated storage and retrieval system 1 with a framework structure 100 and FIGS. 2 and 3 discloses two different prior art container handling vehicles 250 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102,103 may typically be made of metal, e.g. extruded aluminum profiles.

The framework structure 100 of the automated storage and retrieval system 1 comprises a transport rail system 108 arranged across the top of framework structure 100, on which transport rail system 108 a plurality of container handling vehicles 250 are operated to raise storage containers 106 from, and lower storage containers 106 into, the storage columns 105, and also to transport the storage containers 106 above the storage columns 105. The transport rail system 108 comprises a first set of parallel rails 110 arranged to guide movement of the container handling vehicles 250 in a first direction X across the top of the frame structure 100, and a second set of parallel rails 111 arranged perpendicular to the first set of rails 110 to guide movement of the container handling vehicles 250 in a second direction Y which is perpendicular to the first direction X. A plurality of cells 122 are formed in the transport rail system 108 being delimited by a pair of neighboring rails 110a,110b of the first set of rails 110 and a pair of neighboring rails 111a,111b of the second set of rails 111.

Containers 106 stored in the columns 105 are accessed by the container handling vehicles through access openings 112 in the transport rail system 108. The container handling vehicles 250 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 250 comprises a vehicle body 250a and a wheel assembly comprising first and second sets of wheels 250b,250c which enable the lateral movement of the container handling vehicles 250 in the X direction and in the Y direction, respectively. In FIGS. 2 and 3 two wheels in each set are fully visible. The first set of wheels 250b is arranged to engage with two adjacent rails of the first set 110 of rails, and the second set of wheels 250c is arranged to engage with two adjacent rails of the second set 111 of rails. At least one of set wheels 250b,250c can be lifted and lowered, so that the first set of wheels 250b and/or the second set of wheels 250c can be engaged with the respective set of rails 110,111 at any one time.

Each prior art container handling vehicle 250 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 250 so that the position of the gripping/engaging devices with respect to the vehicle 250 can be adjusted in a third direction Z which is orthogonal the first direction X and the second direction Y. Parts of the gripping device of the container handling vehicle 250 is shown in in FIG. 3 and is indicated with reference number 254. The gripping device of the container handling device 250 is located within the vehicle body 250a in FIG. 2.

Conventionally, and also for the purpose of this application, $Z=1$ identifies the uppermost layer of storage containers, i.e. the layer immediately below the transport rail system 108, $Z=2$ the second layer below the transport rail system 108, $Z=3$ the third layer etc. In the exemplary prior art disclosed in FIG. 1, $Z=8$ identifies the lowermost, bottom layer of storage containers. Similarly, $X=1 \ldots n$ and $Y=1 \ldots n$ identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position $X=10$, $Y=2$, $Z=3$. The container handling vehicles 250 can be said to travel in layer $Z=0$, and each storage column 105 can be identified by its X and Y coordinates.

The storage volume of the framework structure 100 has often been referred to as a grid 104, where the possible storage positions within this grid is referred to as a storage cell. Each storage column may be identified by a position in an X- and Y-direction, while each storage cell may be identified by a container number in the X-, Y and Z-direction.

Each prior art container handling vehicle 250 comprises a storage compartment or space for receiving and stowing a storage container 106 when transporting the storage container 106 across the transport rail system 108. The storage space may comprise a cavity arranged centrally within the vehicle body 250a as shown in FIG. 2 and as described in e.g. WO2015/193278A1, the contents of which are incorporated herein by reference.

FIG. 3 shows an alternative configuration of a container handling vehicle 250 with a cantilever construction. Such a vehicle is described in detail in e.g. NO317366, the contents of which are also incorporated herein by reference.

The central cavity container handling vehicles 250 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The transport rail system 108 typically comprises rails with grooves into which the wheels of the vehicles are inserted. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks. A track system is therefore arranged on the transport rail system 108.

WO2018146304, the contents of which are incorporated herein by reference, illustrates a typical configuration of a transport rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 250 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 250 can drop off storage containers 106 to be transported to an access or a transfer station, and the second port column 120 may be a dedicated pick-up port column where the container handling vehicles 250 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 250 is instructed to retrieve the target storage container 106 from its position and transport it to the drop-off port column 119. This operation involves moving the container handling vehicle 250 to a location above the storage column 105 in which the target storage container 106 is positioned, retrieving the storage container 106 from the storage column 105 using the container handling vehicle's 250 lifting device, and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 250 is instructed to pick up the storage container 106 from the pick-up port column 120 and transport it to a location above the storage column 105 where it is to be stored. After any storage containers positioned at or above the target position within the storage column stack 107 have been removed, the container handling vehicle 250 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 250 so that a desired storage container 106 can be delivered to the desired location at the desired time without the container handling vehicles 250 colliding with each other, the automated storage and retrieval system 1 comprises a control system 500 which typically is computerized and which typically comprises a database for keeping track of the storage containers 106.

A problem associated with known automated storage and retrieval systems 1 is that it is challenging for personnel to access the transport rail system 108 for carrying out inspection, or to carry out maintenance of or to remove malfunctioning container handling vehicles 250.

Another important problem with maintenance or removal of malfunctioning vehicles 250 is that a complete shutdown of the system 1 is needed in a prior art storage system for the personnel to access with low or zero risk of injury.

In particular for large systems 1, for example systems 1 with excess of 500 vehicles in operation simultaneously, a complete shutdown is highly undesired due to significant cost for the operator.

It is therefore an objective of the present invention to provide a method for handling malfunctioning vehicles on such a system, as well as a control system 500 having a software stored thereon being able to execute such a method, that solves or at least mitigates one or more of the aforementioned problems related to the use of prior art storage and retrieval systems.

A particular objective is to provide a method that allows personnel to enter the track system without requiring a complete shutdown.

SUMMARY OF THE INVENTION

The present invention is set forth and characterized in the independent claims, while the dependent claims describe other characteristics of the invention.

In a first aspect, the invention concerns a method for handling malfunctioning vehicles on a track system constituting part of an automated storage and retrieval system configured to store a plurality of stacks of storage containers.

The automated storage and retrieval system further comprises a plurality of remotely operated vehicles comprising driving wheels configured to move laterally on the track system, i.e. within a horizontal plane set up by the track system, and a control system for monitoring and controlling wirelessly movements of the plurality of remotely operated vehicles.

The method performs by wireless data communication with the control system at least the following steps:
A. detecting an anomaly in an operational condition of a vehicle on the supporting track system,
B. registering the vehicle with the anomalous operational condition as a malfunctioning vehicle,
C. registering a halt position ($X_S$, $Y_S$) of the malfunctioning vehicle relative to the track system,
D. setting up a two-dimensional shutdown zone on the track system comprising
  a malfunctioning vehicle zone including the halt position of the malfunctioning vehicle and
  an entrance zone for entry into the malfunctioning vehicle zone, the entrance zone extending between the malfunctioning vehicle zone and a location at a periphery of the track system,
E. ordering the remotely operated vehicles in operation within the shutdown zone to either move out of the shutdown zone, to halt or a combination thereof and
F. indicating allowance of entry into the entrance zone for an external operator by at least one of
  unlocking a gateway at the periphery,
  producing an entry-allowed signal registrable by a human operator located at the periphery such that the human operator may enter the entrance zone through the gateway.

Step E includes, in other words, ordering all the remotely operated vehicles in operation within the shutdown zone to either move out of the shutdown zone, to halt within the shutdown zone, or a combination thereof such that at least one operable remotely operated vehicle is moved out of the shutdown zone and/or at least one operable remotely operated vehicle is brought to halt.

The indication of allowance of entry into the entrance zone of step F) may for example include that the gateway is automatically opened (partly or fully) such that the human operator can enter the entrance zone or that a lock on the gateway is opened allowing a human operator to open that gateway manually.

The gateway should be understood as a gate or door which allows a human operator to enter the entrance zone when open/unlocked.

The entry-allowed signal may be a visible and/or audio signal indicating that the human operator can safely enter the entrance zone. The visible signal may inter alia be a light, a raised flag, a changing screen or similar, while the audio signal may be one or more alarm tones or similar.

The entry-allowed signal may be any signal registrable by a human operator, and preferably a human operator located outside the gateway. Examples of positions for such signals may be at the gateway and/or on the remotely operated vehicles and/or on the malfunctioning vehicle.

The notification/transmittal of an entry-allowed signal may appear on a graphical user interface (GUI) of a computer connected to the control system informing the human operator that it is safe to enter the entrance zone. Also, or alternatively, a dedicated software may be uploaded on the computer allowing the human operator to inform the system when the service of the malfunctioning vehicle has been completed and the shutdown zone can be removed. The latter software may for example use the same GUI on which the entry-allowed signal is shown.

The track system comprises a plurality of parallel tracks extending in a first direction X, and a plurality of tracks extending in a second direction Y which is orthogonal to the first direction X. The track system thereby forms a grid pattern of adjacent grid cells of equal size.

When the control system orders the remotely operated vehicles to halt, the remotely operated vehicles which are moving can be ordered to use their brakes to stop the remotely operated vehicle followed by for example turning off the power supply to the driving wheels. Remotely operated vehicles which are already standing still may be ordered to turn off the power supply to the driving wheels such that the operable remotely operating vehicle cannot move.

The control system thereby controls which operable remotely operated vehicles are brought to halt, if any, and which operable remotely operated vehicles are moved out of the shutdown zone, if any.

Any remotely operated vehicle(s) ordered to move out of the shutdown zone may be further ordered to continue operating outside the shutdown zone or it may be ordered to halt at a specific location outside the shutdown zone.

The control system may, in step B, register an anomaly in one or more operational conditions of the remotely operated vehicle on the track system, such as, for example, movement patterns, temperatures, temperature distribution, battery status, stability etc, to register the remotely operated vehicle(s) with the anomalous operational condition(s) as a malfunctioning vehicle(s).

In an example of the present invention, where the malfunction of the remotely operated vehicle does not affect the movement of the wheels, the method may include, between method step B and C, transmitting a shutdown command to the malfunctioning vehicle bringing the malfunctioning vehicle to a halt.

The remotely operated vehicles are configured to move laterally on the track system. Each of the remotely operated vehicles comprises driving wheels and are configured to move storage containers.

The control system wirelessly monitors and controls movements of the plurality of remotely operated vehicles within the system.

The size of the shutdown zone includes the size of the malfunctioning zone and the size of the entrance zone. The entrance zone may be extending from the periphery of the track system having the gateway to the malfunctioning vehicle zone comprising the malfunctioning vehicle. The size of the malfunctioning vehicle zone may be adapted by the control system to ensure adequate working space for maintenance work and/or replacement work. The size of the entrance zone may be adapted by the control system to ensure adequate space for a human operator, optionally located within a service vehicle, to move from the periphery of the track system to the malfunctioning vehicle zone. Thereby the shutdown zone provides no risk for a human operator being hit by one or more operating vehicles when entering or operating within shutdown zone. Hence, the shutdown zone is flexible in size and position.

In an example the shutdown zone may have the size of the entire track system where the control system in method step E orders all the operable remotely operating vehicles in operation on the track system to turn off the power supply to the driving wheels bringing them to halt.

The operable remotely operating vehicle(s) brought to halt by the control system may display a signal indicating that the power supply to the driving wheels has been switched off, thereby indicating that the operable remotely operating vehicle will not move. The signal may for example be a signal detectable by a human operator such as a visual signal or an audio signal.

The malfunctioning vehicle may also display such a signal indicating that the remotely operated vehicle is malfunctioning and/or indicate that the power supply to the driving wheels has been switched off.

In the example that the shutdown zone has the size of the entire track system, the signal indicating that the power supply to the driving wheels has been switch off indicates to the human operator that there is no risk for the human operator being hit by one or more remotely operated vehicles when entering or operating on the track system.

The control system may be configured such that any transmission of signals for turning back on the power supply to the driving wheels of a halted operable remotely operated vehicle(s) within the shutdown zone and/or at the boundary of the shutdown zone, must be executed by at least one physical intervention of an external operator such as a human or robotic operator. The physical intervention may be turning on a mechanical switch/button and/or entering a specific code, or some other equivalent operation requiring a positive action performed by a human or robotic operator.

In a further example, the method further involves, subsequent to step D, updating a movement pattern of any remotely operated vehicle in operation outside the shutdown zone during and after the time of setting up the shutdown zone such that entry into the shutdown zone is avoided. In other words, the control system may ensure dynamically rerouting of any operable remotely operated vehicle outside the shutdown zone avoiding physical impact with, directly or indirectly via a service vehicle and/or the human operator during movement within the shutdown zone.

In another example, the method further involves that the service vehicle is guided to the halted malfunctioning vehicle via the entrance zone after step F. The service vehicle may be operated remotely by the control system or by a human operator.

The service vehicle may be guided from the gateway into the shutdown zone. In an embodiment, the service vehicle may comprise one, preferably two, caterpillar track(s) configured to drive the service vehicle on top of the track system.

In another example, the service vehicle may move the malfunctioning vehicle out of the track system through the gateway. After removal of the malfunctioning vehicle, the control system can instruct the operable remotely operated vehicles to continue their tasks.

After setting up the shutdown zone and before ordering the remotely operated vehicles in operation within the shutdown zone to either move out of the shutdown zone, to halt or a combination thereof, the method may further involve:

rerouting a plurality of first operable remotely operated vehicles of the remotely operated vehicles operating on the supporting track system to a position located at an edge of the malfunctioning vehicle zone extending across the tracks of the track system, and transmitting one or more signals to the plurality of first operable remotely operated vehicles, bringing them to a halt thereby making a physical barrier of first remotely operated vehicles such that the physical barrier at least partly surrounds the malfunctioning vehicle.

Further, the method may involve rerouting a plurality of second operable remotely operated vehicles of the remotely operated vehicles to a position located at an edge of the entrance zone extending across the tracks of the track system and transmitting one or more signals to the plurality of second operable remotely operated vehicles, bringing the plurality of second operable remotely operated vehicles to a halt.

In other words, the method may involve rerouting a plurality of operable remotely operated vehicles to a position located at an edge of the shutdown zone extending across the tracks of the track system and transmitting one or more signals to the plurality of said operable remotely operated vehicles, bringing the plurality of operable remotely operated vehicles to a halt thereby making a physical barrier of operable remotely operated vehicles such that the physical barrier at least partly surrounds the shutdown zone.

When forming a physical barrier, the operable remotely operated vehicles may be arranged adjacent each other in a closed-pack formation, or they may be spaced apart but with a gap between them of less than the width of a vehicle, preferably the smallest width of the vehicle.

The operable remotely operated vehicles may be arranged in more than one row along part or all of the edge of the malfunctioning vehicle zone, the entrance zone and/or the shutdown zone to form a physical barrier. The operable remotely operated vehicles may be arranged in an overlapping, staggered configuration along part or all of the edge of the malfunctioning vehicle zone, the entrance zone and/or the shutdown zone to form the physical barrier.

Operable remotely operated vehicles should be understood as functioning remotely operated vehicles, thus not including the malfunctioning vehicle.

Preferably, the number of first and second operable remotely operated vehicles being rerouted to the boundaries of the malfunctioning vehicle zone and the entrance zone is sufficient to create a physical barrier of vehicles around the entire shutdown zone with the exception of an opening at the periphery of the track system having a minimum size to allow the human operator and/or the service vehicle to move between the periphery of the track system and the malfunctioning vehicle. If there are insufficient first and second operable remotely operated vehicles to create a physical barrier around the shutdown zone, the shutdown zone may have the size of the entire track system that the malfunctioning vehicle is located on.

The boundary of the malfunctioning vehicle zone, the entrance zone or shutdown zone may be defined as a location where the one or more remotely operated vehicles are located outside the relevant zone set by the control system, but with at least one outer extremity in the horizontal plane at a position at or near position coordinates of relevant zone.

Alternatively, the one or more boundary defining remotely operated vehicles may be located inside the malfunctioning vehicle zone, the entrance zone or shutdown zone set by the control system, but with at least one outer extremity in the horizontal plane at a position at or near position coordinates of the relevant zone.

In a second alternative configuration, the one or more boundary defining remotely operated vehicles may be located with their lateral center position on position coordinates of the relevant zone.

The position coordinates of the malfunctioning vehicle zone, the entrance zone or shutdown zone are preferably based on the particular position of the grid cells in the horizontal plane. For example, position coordinate 15,20 may signify the location of the grid cell X=15 and Y=20 counted from a reference lateral corner of the track system. The malfunctioning vehicle zone, the entrance zone and/or shutdown zone are preferably defined in terms of integer numbers of grid cells, to maintain the grid geometry. However, they could also be defined in other ways as appropriate.

In any case, operable remotely operated vehicles can be employed to form a physical barrier extending around in part the malfunctioning vehicle. These functioning remotely operated vehicles, halted on or adjacent the boundary of the malfunctioning vehicle zone, entrance zone and/or shutdown zone (e.g. just inside or just outside) may be referred to herein as "boundary defining vehicles".

When the boundary defining operable remotely operated vehicles are brought to a halt, additional means may be performed to optimize stability of the physical barrier such as maximizing contact with the underlying track system by lowering all sets of wheels (the wheels of a first set will block any tendency for the wheels of a second set to allow the vehicle to roll in a direction perpendicular to a rolling direction of the first set of wheels and vice versa) and/or to lower/raise a storage container to a midway position through the grid so that the storage container acts as a block within an opening of the grid cell. It may also be possible to arrange the boundary defining vehicles in several layers along the horizontal plane P or staggered, at least in places. For example, a second layer of boundary defining vehicles may partly overlap the boundary defining vehicles of an innermost layer to spread the forces in the event of an impact and/or boundary defining vehicles may be staggered to resist displacement of other boundary defining vehicles that are subject to the impact.

In an embodiment of the automated storage and retrieval system, the track system is divided into a plurality of regions. In an exemplary embodiment the track system has a first track system region and a second track system region, where the second track system region forms the two-dimensional shutdown zone. A vehicle blocking barrier may be arranged between the first and the second track system regions. The vehicle blocking barrier comprises a vehicle passage with a minimum lateral width in the horizontal plane allowing one of the plurality of operable remotely operated vehicles to move between the first track system and the second track system via the vehicle passage. For such an embodiment the method may further involve rerouting of at least one of the plurality of operable remotely operated vehicles (not the malfunctioning vehicle) to a position within the vehicle passage and bringing the at least one operable remotely operated vehicle to a halt such that entry into the second track system region/shutdown zone is avoided. Thus, the rerouting of the operable remotely operated vehicle(s) may be seen to plug the gap in the vehicle blocking barrier, i.e. to block the vehicle passage.

A minimum lateral width is hereinafter defined as a minimum one-dimensional size of an opening, e.g. perpendicular to the direction of a remotely operated vehicle corresponding to the width of the remotely operated vehicle when seen from above.

In another exemplary embodiment the automated storage and retrieval system may comprise at least one fence building remotely operated vehicle which, after step E and before step F, can be ordered to enter the track system to build a fence at least partly surrounding the shutdown zone.

The above-mentioned track systems may be any kind of track system allowing vehicles to move in the two disclosed dimensions X and Y, i.e. wherein the wheels of the remotely operated vehicles can be arranged to move between adjacent grid cells.

In one exemplary embodiment of the automated storage and retrieval system of the invention, the track system may comprise grid cells of plates covering the horizontal extent of the grid cell thereby separating the tracks.

In another preferred exemplary embodiment of the automated storage and retrieval system, the track system may be arranged on a rail system. The rail system may comprise a first set of parallel rails arranged in a horizontal plane and extending in a first direction X and a second set of parallel rails arranged in the horizontal plane and extending in a second direction Y which is orthogonal to the first direction , the first and second sets of rails forming the grid pattern in the horizontal plane comprising a plurality of adjacent grid cells. Each grid cell comprises a grid opening defined by a pair of adjacent rails of the first set of rails and a pair of adjacent rails of the second set of rails. Each rail of the rail system may preferably be of type double track rails but may also be of type single track rails or a combination of double track rails and single track rails.

The rail system of the automated storage and retrieval system may in another exemplary embodiment be a transport rail system as disclosed in the background section on which a plurality of remotely operated vehicles are configured to move laterally. The transport rail system is arranged across the top of a framework structure wherein the framework structure comprises upright members, horizontal members and a storage volume comprising storage columns arranged in rows between the upright members and the horizontal members. In these storage columns storage containers, also known as bins, are stacked one on top of one another to form stacks. The upright and horizontal members may typically be made of metal, e.g. extruded aluminum profiles. The plurality of remotely operated vehicles operating on a transport rail system is hereinafter referred to as container handling vehicles. The container handling vehicles are operated to raise storage containers from, and lower storage containers into, the storage columns, and also to transport the storage containers above the storage columns.

In the exemplary embodiment where the rail system is a transport rail system, the control system may order the operable container handling vehicles to set up a physical barrier which at least partly surrounds the malfunctioning vehicle wherein the physical barrier comprises storage containers. The operable container handling vehicles may be instructed to fill up a storage column with storage containers such that the storage container on top of the stack is above the horizontal plane of the transport rail system at the edge of the shutdown zone. In this embodiment the operable container handling vehicles may be a prior art container handling vehicle comprising a cantilever construction as discussed in the background section.

In a further exemplary embodiment of the invention, the automated storage and retrieval system may comprise a upper track system being arranged on a transport rail system as discussed above and a lower track system being a delivery track system.

The transport rail system is in this embodiment situated at an upper height HT on which a plurality of remotely operated container handling vehicles are configured to move laterally and where the delivery track system is situated at a lower height HD lower than the upper height $H_T$ on which a plurality of remotely operated vehicles are configured to move laterally. The remotely operated vehicles moving on the delivery track system are hereinafter referred to as delivery vehicles. The remotely operated container delivery vehicles are further configured to receive storage containers from the higher located container handling vehicles. In such an exemplary embodiment the method steps B-F are performed for the plurality of container handling vehicles in a case where the control system registers an anomaly in an operational condition of a container handling vehicle and/or for the plurality of remotely operated container delivery vehicles in a case where the control system registers an anomaly in an operational condition of a remotely operated delivery handling vehicle.

Further, each of the plurality of container handling vehicles may be configured
  to lift the storage containers stacked in the stacks through a grid opening using a lifting device,
  to move the storage containers to other locations on the transport rail system and
  to lower the storage containers down to the delivery track system using the lifting device.

The plurality of container delivery vehicles may comprise a set of wheels configured to move the container delivery vehicle along tracks of the delivery track system and a drive motor configured to provide rotational power to the set of wheels, and
  a container carrier configured to receive the storage container from above and onto the container carrier.

Each of the plurality of container delivery vehicles may comprise propulsion means such as a set of wheels or belts configured to move the container delivery vehicle along or on top of the tracks of the delivery track system and a drive motor configured to provide power to the propulsion means such as rotational power to one or more wheels or belts, and a container carrier configured to receive the storage container from above and onto, or at least partly into, the container carrier, preferably so that contents within the storage container are accessible by a robot arm or a human operator.

The delivery track system may comprise a first track system located within the framework structure of the storage grid, and a second track system located outside the framework structure of the storage grid, and wherein the first and second track system are connected such that the delivery vehicle may operate between said track systems.

Further, the automated storage and retrieval system may comprise a plurality of laterally spaced apart transport rail system modules onto which the plurality of container handling vehicles are moving and wherein the delivery track system is configured such that one of the plurality of container delivery vehicles is allowed to move below all or more than one of the plurality of laterally spaced apart transport rail system modules during normal operation.

The method may then comprise the step of rerouting the plurality of container delivery vehicles away from a two-dimensional zone projected down to the delivery track system from any two-dimensional shutdown zone set up on the transport rail system.

In one exemplary embodiment the delivery track system may comprise grid cells comprising plates covering the horizontal extent of the grid cell, wherein the wheels of the remotely operated vehicles can be arranged to move between adjacent grid cells.

The delivery track system may in a preferred embodiment be arranged on a delivery rail system comprising a first set of parallel rails arranged in a first direction X and a second set of parallel rails arranged in a second direction Y orthogonal to the first direction X, wherein the first and second sets of rails form the grid pattern in the horizontal plane comprising a plurality of adjacent grid cells. Each grid cell comprises a grid opening defined by a pair of adjacent rails of the first set of rails and a pair of adjacent rails of the second set of rails. As for the transport rail system, the rails of the delivery rail system are preferably of type double track rails. But they may also be of type single track rails or a combination of double and single track rails.

A second aspect of the invention relates to an automated storage and retrieval system operating to handle malfunctioning vehicles by a method in accordance with any of the above-mentioned features. The automated storage and retrieval system is configured to store a plurality of stacks of storage containers and comprises a plurality of remotely operated vehicles comprising driving wheels configured to move laterally on a track system, i.e. within a horizontal plane set up by the track system. Further the automated storage and retrieval system comprises a control system for monitoring and controlling wirelessly movements of the plurality of remotely operated vehicles. The automated storage and retrieval system may further be in accordance with any of the above-mentioned storage and retrieval systems.

A third aspect of the invention relates to a control system of any of the above-mentioned automated storage and retrieval systems. The control system is configured to monitor and control wirelessly movements of the plurality of remotely operated vehicles. Further, the control system comprises a computer program that, when executed on a processor of the control system, is configured to perform a method in accordance with any of the above-mentioned features. The control system may be in accordance with any of the above-mentioned control systems.

In the following description, numerous specific details are introduced to provide a thorough understanding of embodiments of the method and its related automated storage and retrieval system. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

Following drawings are appended to facilitate the understanding of the invention. The drawings show embodiments of the invention, which will now be described by way of example only, where:

FIG. 4A shows a part of the system having a delivery rail system with container delivery vehicles operating below the rail system of container handling vehicles and FIG. 4B shows an example of a container delivery vehicle having a storage container stored within.

FIG. 10A shows a service vehicle having two set of wheels configured to follow the rails in X and Y directions and FIG. 10B shows a service vehicle having caterpillar tracks configured to drive on top of the rail system.

DETAILED DESCRIPTION OF THE INVENTION

Figure 1:
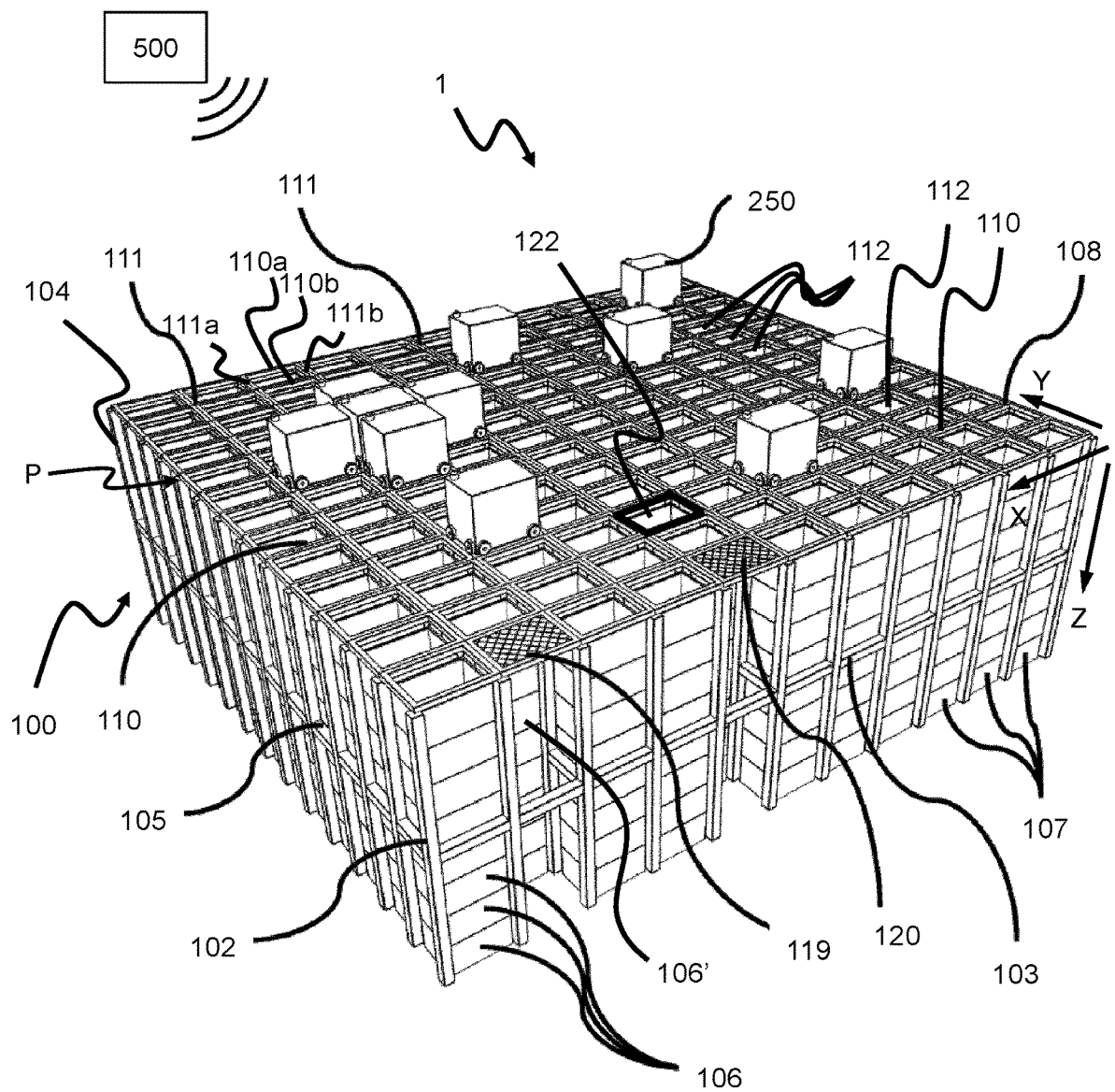
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

In the exemplary embodiments below the track system(s) is arranged on a rail system(s).

The framework structure 100 of the automated storage and retrieval system 1 can be constructed in accordance with the prior art framework structure 100 described above in connection with FIG. 1, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 2:
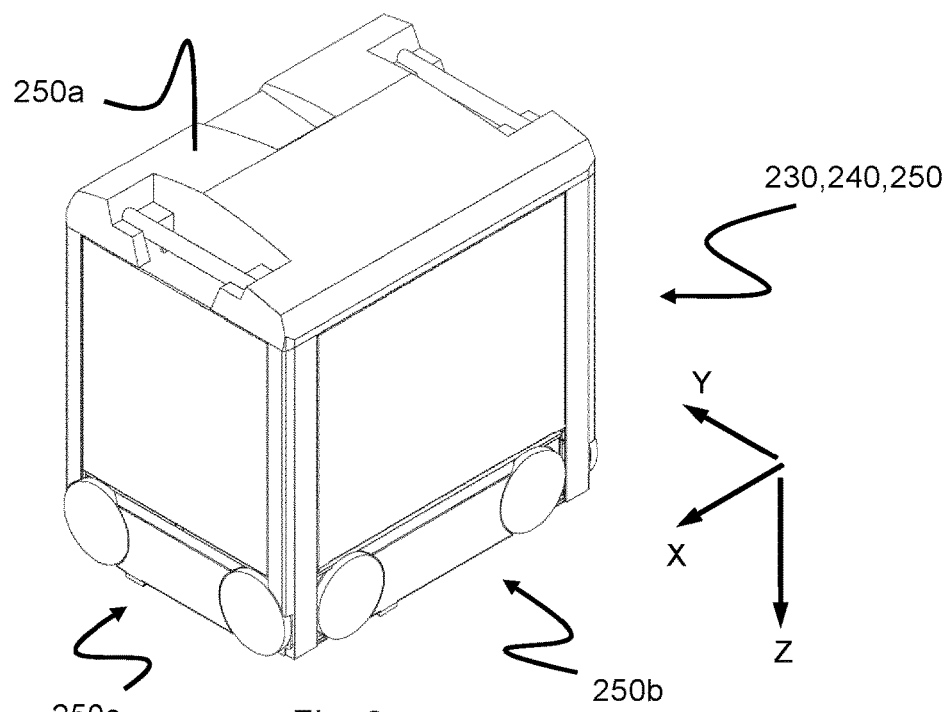
FIG. 2 is a perspective view of a prior art container handling vehicle having a centrally arranged cavity for carrying storage containers therein.
Figure 3:
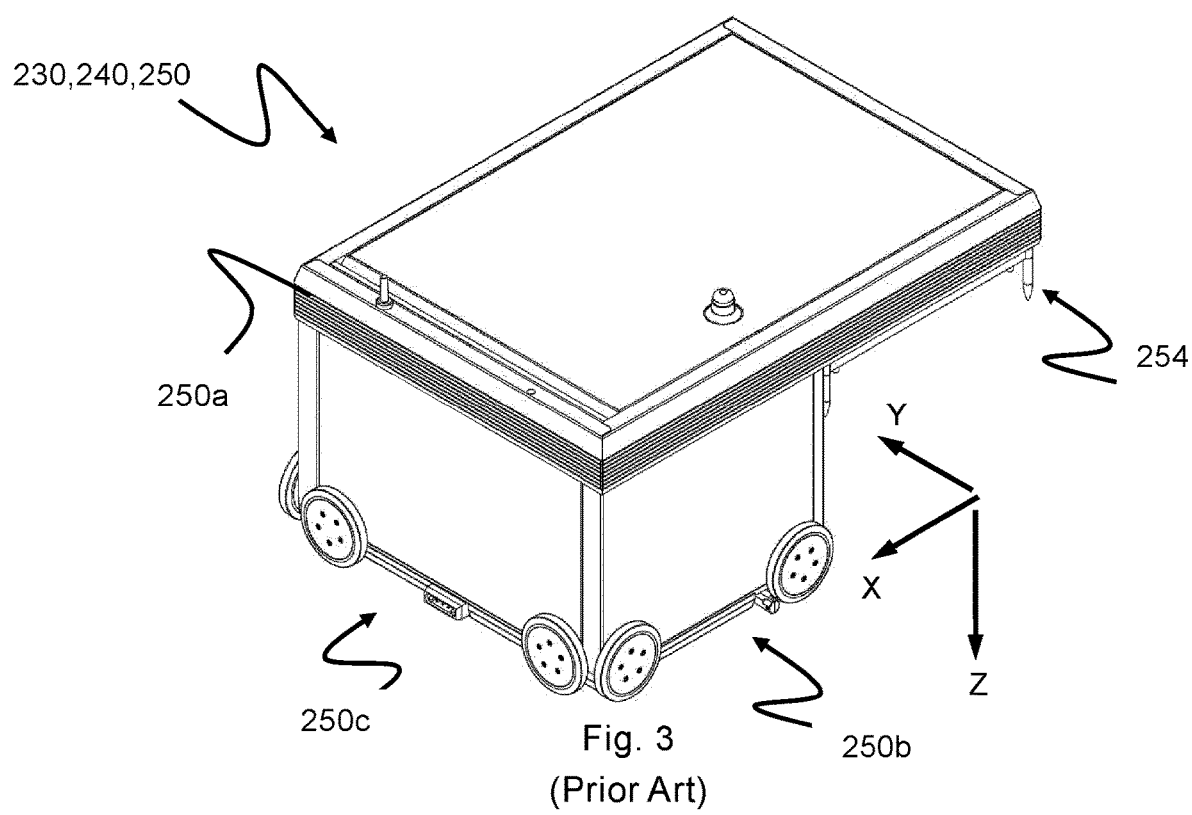
FIG. 3 is a perspective view of a prior art container handling vehicle having a cantilever for carrying storage containers underneath.

Examples of remotely operated vehicles are shown in FIGS. 2, 3 and 8B. FIGS. 2 and 3 show remotely operated container handling vehicles 230,240,250, while FIG. 4B shows a remotely operated delivery vehicle 330,340,350.

All remotely operated vehicles 230,240,250,330,340,350 may be controlled by a remote control system 500.

The container handling vehicles 230,240,250 may be of any type known in the art, e.g. any one of the automated container handling vehicles disclosed in WO2014/090684 A1, in NO317366 or in WO2015/193278A1.

Figure 4:
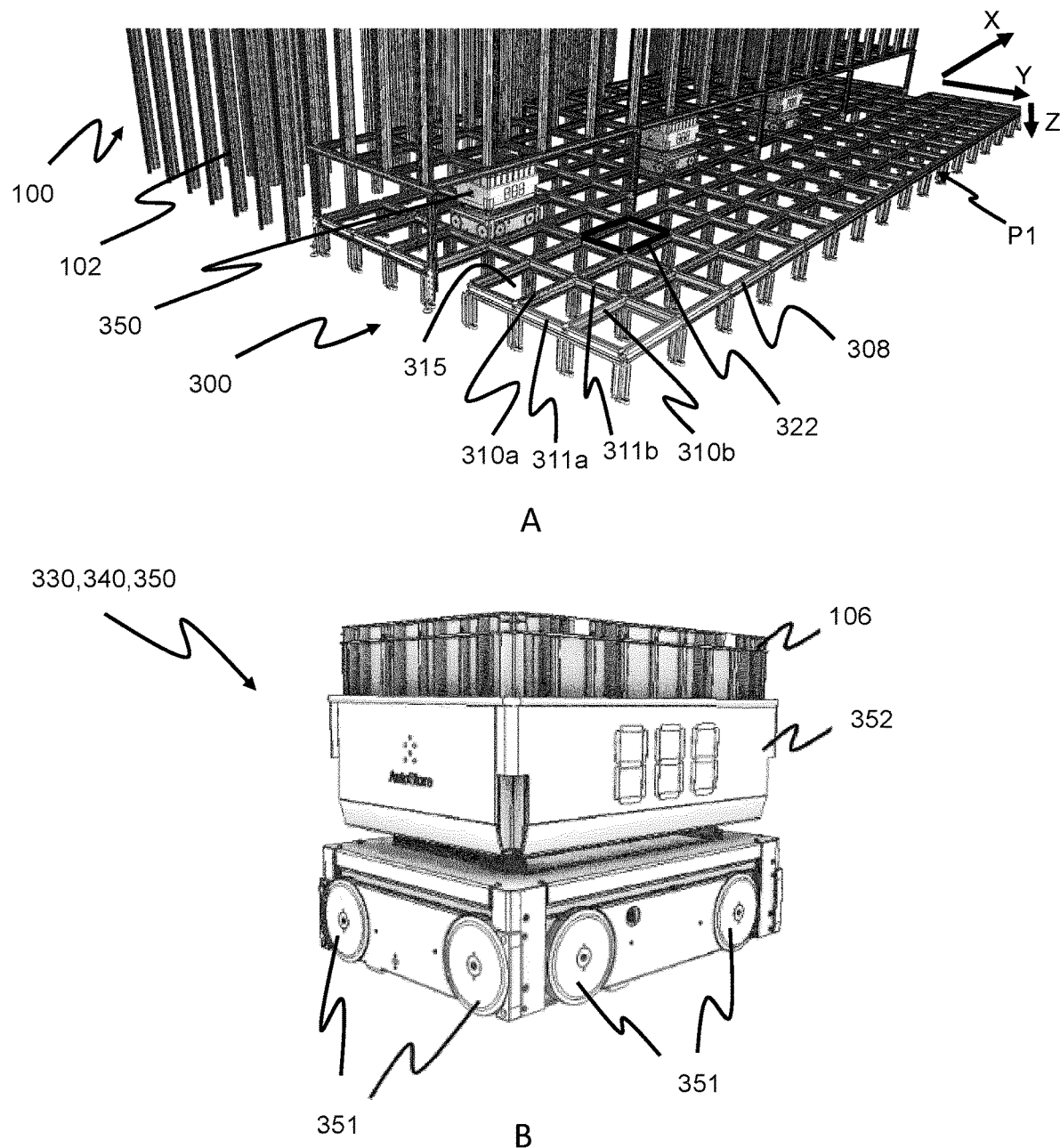
FIGS. 4A and 4B are perspective views of an exemplary automated storage and retrieval system according to the invention, where

A different automated storage and retrieval system 1 is shown in part in FIG. 4A. The upright members 102 constitute part of a framework structure 100 onto which a transport rail system 108 with a plurality of container handling vehicles 250 are operating.

Below this transport rail system 108, near the floor level, another framework structure, a so-called delivery framework structure 300 is shown which partly extends below some of the storage columns 105 of the framework structure 100. As for the other framework structure 100, a plurality of remotely operated vehicles of the type container delivery vehicles 330,340,350 may operate on a rail system being a delivery rail system 308. The delivery rail system comprises a first set of parallel rails 310 directed in a first direction X and a second set of parallel rails 311 directed in a second direction Y perpendicular to the first direction X, thereby forming a grid pattern in the horizontal plane P1 comprising a plurality of rectangular and uniform grid locations or cells 322. Each cell of this lower rail system 308 comprises a grid opening 315 being delimited by a pair of neighboring rails 310a,310b of the first set of rails 310 and a pair of neighboring rails 311a,311b of the second set of rails 311.

The part of the delivery rail system 308 that extends below the storage columns 105 are aligned such that its cells 322 are in the horizontal plane P1 coincident with the cells 122 of the upper rail system 108 in the horizontal plane P.

Hence, with this particular alignment of the two rail systems 108,308, a storage container 106 being lowered down into a storage column 105 by a container handling vehicle 250 can be received by a container delivery vehicle 350 configured to run on the rail system 308 and to receive storage containers 106 down from the storage column 105.

FIG. 4B shows an example of such a container delivery vehicle 350 comprising a wheel assembly 351 similar to the wheel assembly 250b,c described for the prior art container handling vehicle 250 and a storage container support 352 for receiving and supporting a storage container 106 delivered by an above container handling vehicle 250.

After having received a storage container 106, the container delivery vehicle 350 may drive to an access station adjacent to the rail system 308 (not shown) for delivery of the storage container 106 for further handling and shipping.

Hereinafter, the upper and lower rail systems 108,308 are called the transport rail system 108 and the delivery rail system 308. Likewise, the vehicle shown in FIG. 4B is called a container delivery vehicle 350.

Figure 5:
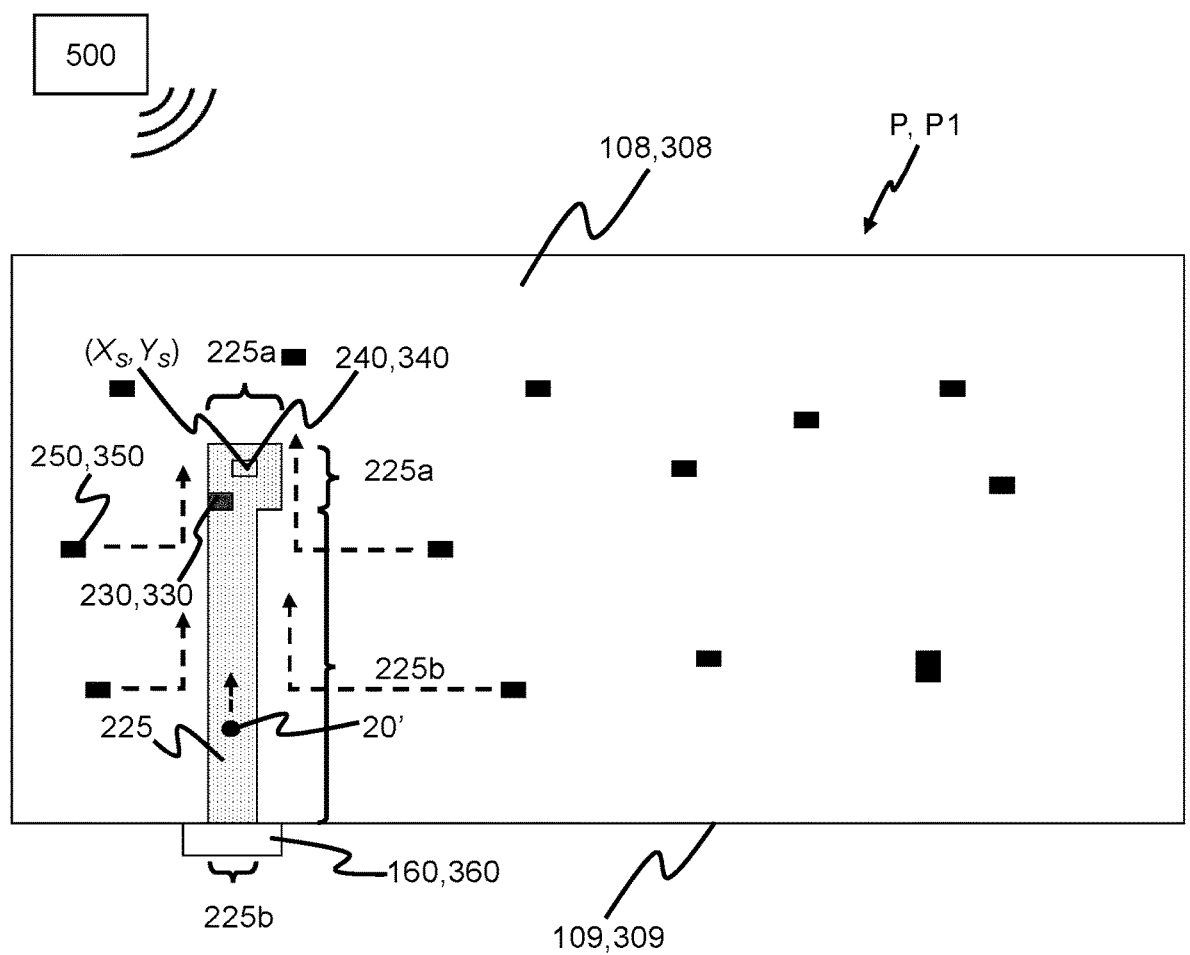
FIG. 5 is a schematic top view of an automated storage and retrieval system according to a first embodiment of the invention where a shutdown zone has been created by a control system in which a malfunctioning container handling vehicle has stopped.
Figure 6:
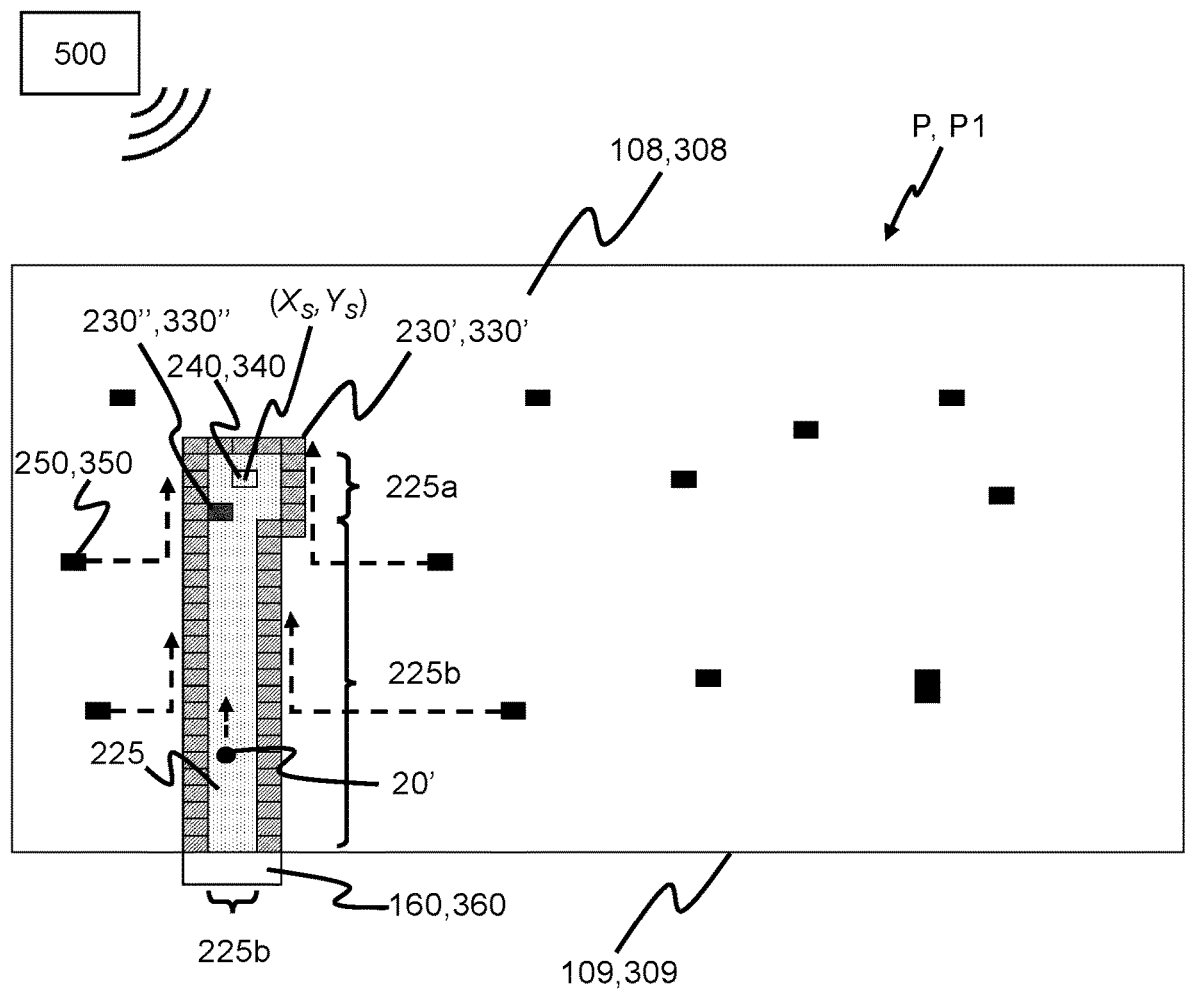
FIG. 6 is a schematic top view of the automated storage and retrieval system according to FIG. 5 and shows a second embodiment of the invention where a service vehicle is moving towards the shutdown zone while operative remotely operated vehicles have been instructed to create a physical barrier at the shutdown zone boundaries.
Figure 7:
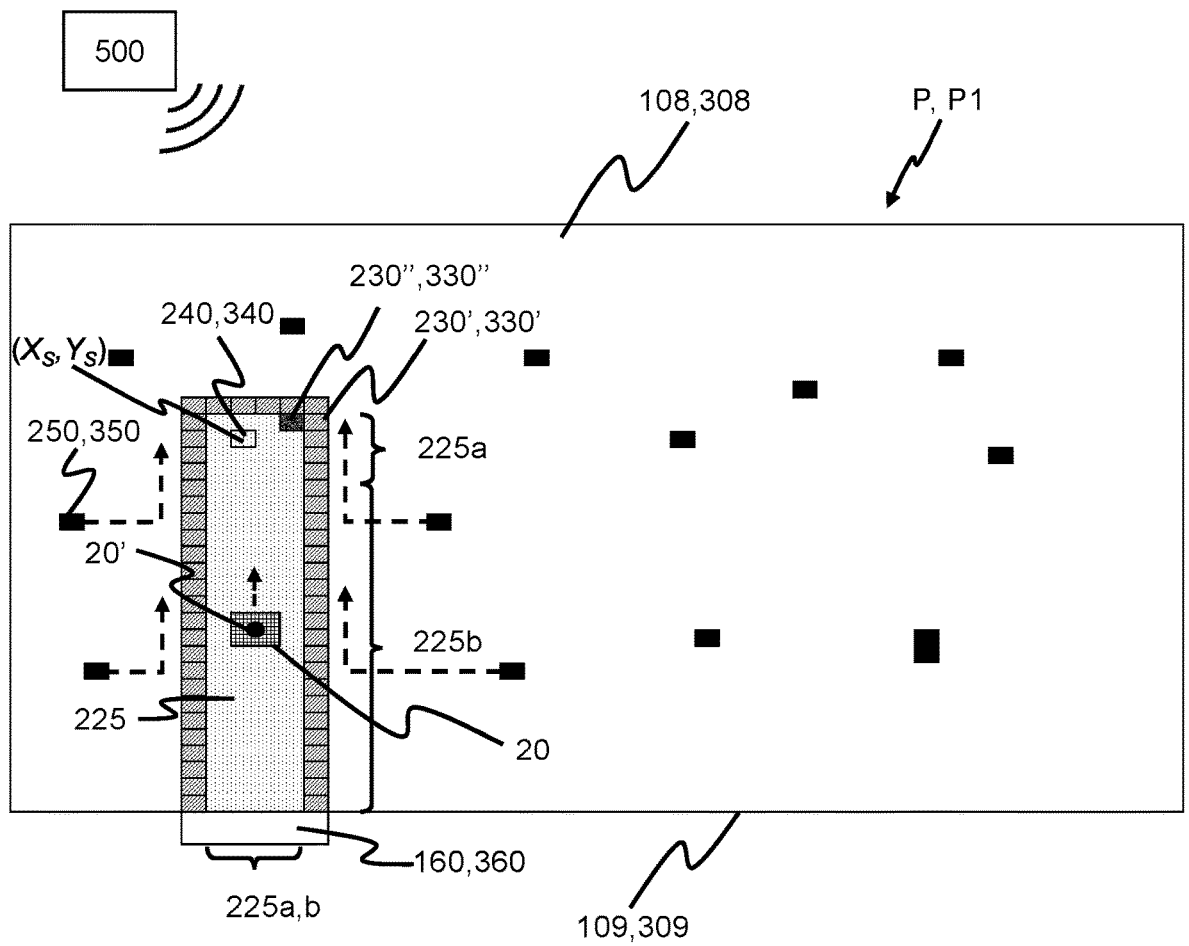
FIG. 7 is schematic top view of the automated storage and retrieval system and shows a similar embodiment of the invention as shown in FIG. 6 where a service vehicle is moving towards the shutdown zone while operative remotely operated vehicles have been instructed to create a physical barrier at the shutdown zone boundaries, but wherein the shutdown zone has a different configuration.

FIGS. 5, 6 and 7 show exemplary embodiments of a rail system 108,308 which can be a transport rail system 108 at a horizontal plane P as shown in FIG. 1 or a delivery rail system 308 at a horizontal plane P1 shown in FIG. 4A.

The rail system 108,308 comprises a shutdown zone 225 having a malfunctioning vehicle zone 225a and an entrance zone 225b. The malfunctioning vehicle zone 225a comprises a malfunctioning vehicle 240,340. The entrance zone 225b allows a human operator or a service vehicle to enter the entrance zone through a gateway 160,360 arranged at the periphery 109,309 of the rail system 108,308. The entrance zone 225b extending from the periphery of the rail system 108,308 having the gateway 160,360 to the malfunctioning vehicle zone 225a comprising the malfunctioning vehicle 240,340.

FIG. 5 shows the situation where the control system 500 has
  detected a malfunctioning vehicle 240,340,
  brought the malfunctioning vehicle 240,340 to a halt at a position (Xs,Ys) and
  generated a shutdown zone 225 having a malfunctioning vehicle zone 225a into which the halted malfunctioning vehicle 240 is located and an entrance zone 225b for entry of a person or a service vehicle 20 into the malfunctioning vehicle zone 225a,
  instructed operable remotely operated vehicles 230",330" within the shutdown zone 225 to halt,
  rerouted the operable remotely operating vehicles 250, 350 operating outside the shutdown zone 225 preventing them from entering the shutdown zone 225, and
  instructed a human operator 20' to walk inside the shutdown zone 225 from the gateway 160,360 to the malfunctioning vehicle 240,340.

As an alternative to rerouting the operable remotely operated vehicles 250,350 operating outside the shutdown zone 225, the operable remotely operated vehicles 250,350 may all be instructed to halt while the human operator 20' is inside the shutdown zone to increase the safety of the human operator 20'.

FIG. 6 shows a later situation where the control system 500 has
  instructed a plurality of first operative remotely operated vehicles 230',330' to move to the boundaries of the generated shutdown zone 225 to create a physical barrier partly surrounding the shutdown zone comprising an entrance zone 225b and a malfunctioning vehicle zone 225a,
  rerouted all other operative remotely operated vehicles 250,350 to prevent (or at least significantly reduce the risk of) collisions between an operative remotely operated vehicle 250,350 and the human operator 20' when the human operator 20' is travelling inside the shutdown zone 225 between the gateway 160,360 and the malfunctioning vehicle 240,340.

FIG. 7 mainly differs from FIG. 6 in that the human operator 20' in FIG. 6 has been replaced with a service vehicle 20 in FIG. 7. Further, the size of the shutdown zone 225 has increased to allow safe movement of the service vehicle 20 inside the shutdown zone 225.

Whilst the operator is on the service vehicle 20, he or she may be relatively safe, protected by safety barriers fitted around a cockpit area of the service vehicle. Once the service vehicle 20 has entered the shutdown zone 225, the operator may want to step off the service vehicle 20 to service the malfunctioning vehicle 240. Thus, at this point any operator previously on the service vehicle 20 may at this latter stage perform work on the malfunctioning vehicle 240 while out of the protection of the service vehicle 20. The work may involve any in-situ maintenance work and/or transport of the vehicle 240 on the service vehicle 20 to another location, for example a workshop outside the rail system 108,308.

As shown, a central point of the malfunctioning vehicle zone 225a may be offset with respect to the malfunctioning vehicle 240. This creates an area to receive the service vehicle 20 and/or an operator within the shutdown zone 225 whilst minimizing the number of other remotely operated vehicles 230' required to form the physical barrier.

In general, the shutdown zone 225 and the corresponding boundary defining, parked operable remotely operated vehicles 230',330' may be of any shape when viewed from above, for example circular, oval, triangular, hexagonal, octagonal, or a more irregular, e.g., organic shape, etc.

If the malfunctioning vehicle 240,340 has been brought to a halt near an obstacle such as a roof pillar a part trigonometric form such as a half-octagonal shape or half-rectangular shape may be advantageous as a barrier.

Further, the boundary setting operable remotely operated vehicles 230',330' may be placed on different positions relative to the boundaries of the shutdown zone 225. The operable remotely operated vehicle 230',330' may be placed outside the boundaries with one of its walls (an outermost vehicle wall from the malfunctioning vehicle 240,340) at a horizontal/lateral position equal to the corresponding position of the boundaries. However, an alternative position may be envisaged such that each or some of the operable remotely operated vehicles 230',330' are placed at least partly on the boundaries or fully within the shutdown zone 225 with one outer wall at a horizontal/lateral position equal to the corresponding position of the boundaries.

In order to provide a barrier that may better withstand collisions from outside, a barrier of operable remotely operated vehicles 230',330' may also be more than one vehicle wide. Such remotely operated vehicles 230',330' may be staggered. In some cases it may be desirable to space some of the remotely operated vehicles 230',330' from an adjacent remotely operated vehicle, but only by an amount which is less than a width of the remotely operated vehicles 230',330'.

Figure 8:
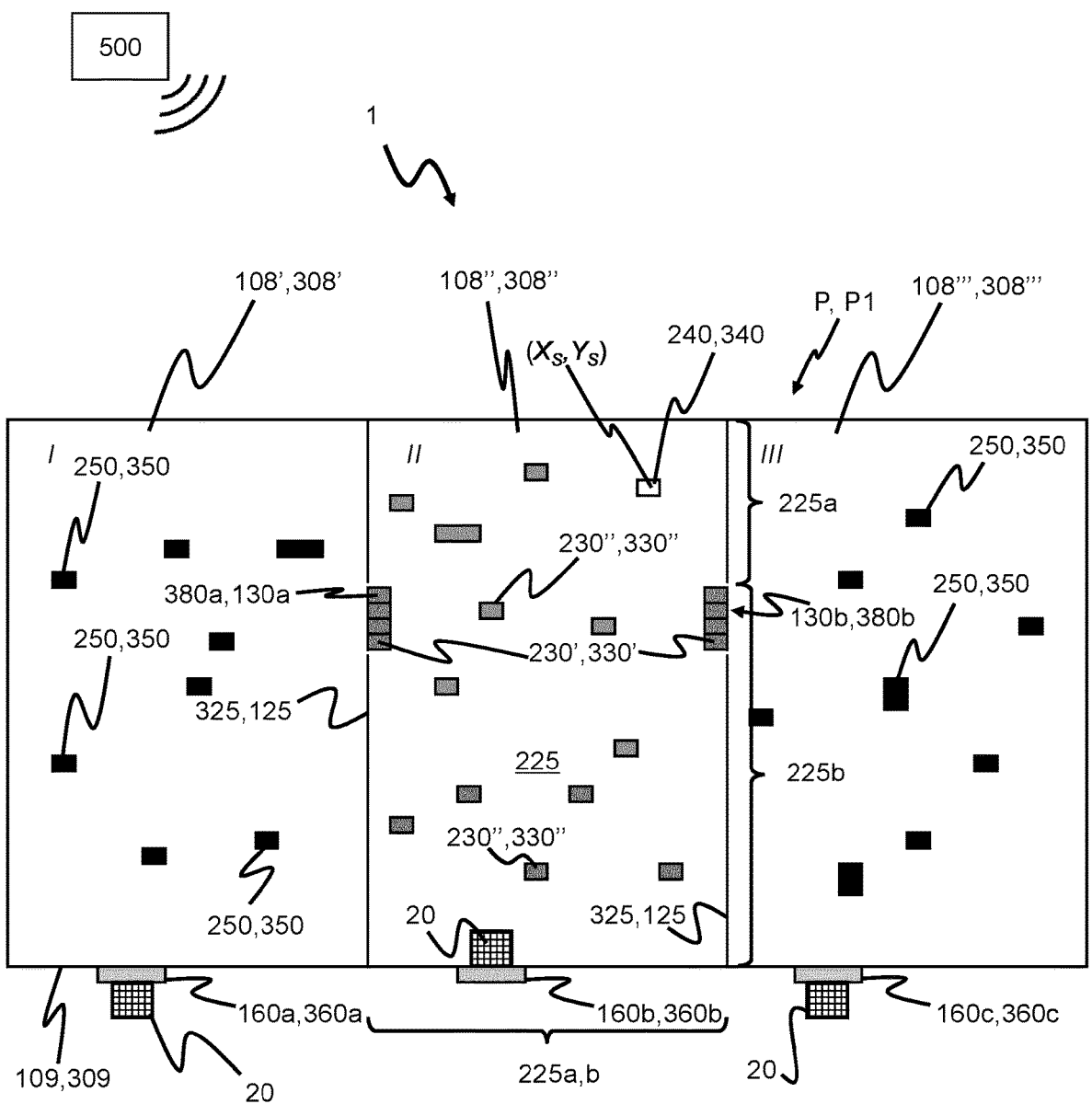
FIG. 8 is a schematic top view of an automated storage and retrieval system according to a fourth embodiment of the invention where the rail system is divided into three delivery systems being partly separated by a vehicle blocking barrier.

FIG. 8 shows a top view of an automated storage and retrieval system 1 according to an embodiment of the invention. The system 1 comprises a rail system divided into three rail system regions 108',108",108"',308',308",308"'. In an example, each of the rails system regions 108',108",108"' may have a storage grid with stacks of storage containers wherein the rail system regions 108',108",108"' arranged on top of the storage grid. In another example, each of the rails system regions 308',308",308"' are delivery rail systems as shown in FIG. 8A.

Each of the three rail systems 108',108",108"',308',308", 308"' comprise a gateway 160a-c,360a-c. The rail system regions 108',108",108"',308',308",308"' are separated by two vehicle blocking barriers 125,325, e.g., walls, arranged between the rail system regions 108',108",108"',308',308", 308"'. Each of the barriers 125,325 includes one or more passages 130a,130b,380a,380b in which operable remotely operated vehicles 230,240,250,330,340,350 may drive through during normal operation.

In FIG. 8 a particular situation is depicted where a remotely operated vehicle 240,340 has been labeled malfunctional and brought to a halt at a location on the mid rail system 108",308". As a response to the presence of the malfunctioning vehicle 240,340, some of the operable remotely operated vehicles 230',330' are instructed by a control system 500 to move into the passages 130a,130b, 380a,380b of both barriers 125,325 to create two continuous (e.g., at least having no gaps which a remotely operated vehicle can pass through) physical barriers along the entire length of the rail system regions 108',108",108''',308',308", 308''', thereby preventing operative remotely operated vehicles 250,350 located on the left and right rail systems regions 108',308',108''',308''' to enter the mid rail system region 108". Any remaining operable remotely operated vehicles 230",330" still in operation on the mid rail system region 108",308" are brought to a halt. Consequently, there will be no remotely operated vehicles 250,350 operative within the mid/second rail system region 108",308". Such a region is also called a shutdown zone 225. The shutdown zone 225 comprises malfunctioning vehicle zone 225a and an entrance zone 225b. The malfunctioning vehicle zone 225a includes the malfunctioning vehicle 240,340, and the entrance zone 225b for entering into the malfunctioning zone 225a. The entrance zone 225b is extending between the malfunctioning vehicle zone 225a and the periphery of the mid rail system region 108", 308" which includes the gateway 160b,360b. As shown in FIG. 8, the service vehicle 20 has entered through the gateway 160b,360b into the entrance zone 225b of the shutdown zone 225.

All of the above-mentioned steps are controlled and monitored by a remote control system 500.

With no operative container handling vehicles 250,350 within the shutdown zone 225, an operator may enter the mid rail system region 108",308" via a mid gateway 160b, 360b. The operator may choose to walk to, for example, the malfunctioning vehicle 240,340 on foot.

However, in a preferred example of the method, a service vehicle 20 enters the mid rail system region 108",308" via the mid gateway 160b,360b and drives across the mid rail system region 108",308" to, for example, the malfunctioning container handling vehicle 240,340, preferably with an onboard operator.

To minimize the risk of injury or accidents, the above step of entering the rail system 108,308 with a service vehicle 20 through a gateway 160a-c,360a-c is preferably performed after the above described process of creating the shutdown zone 225. The step may however also be performed, or initiated, during the process or the entrance zone and the malfunctioning vehicle zone could be created in a dynamic way, e.g., the entrance zone first and then the malfunctioning vehicle zone second as the operator progresses across the entrance zone as long as such steps are considered sufficiently safe with regard to the risk of injury or accidents.

The gateways 160a-c,360a-c may be adjacent to a mezzanine outside the periphery of the rail systems 108,308, for supporting the service vehicle 20 while it is inactive.

In FIG. 8, a gateway 160a-c,360a-c and a service vehicle 20 is depicted for each of the rail system regions 108',108", 108''',308',308",308'''. Thus, in case a malfunctioning vehicle 240,340 is brought to a halt in the left/first rail system region 108',308', then the left/first rail system will be the shutdown zone.

In an example, the rail system is a transport rails system comprising transport rail system regions 108',108",108'''. The transport rail system may have a storage grid with stacks of storage containers wherein the rail system regions 108', 108",108''' arranged on top of the storage grid. In another example, each of the rails system regions 308',308",308''' are delivery rail systems as shown in FIG. 4A.

Figure 9:
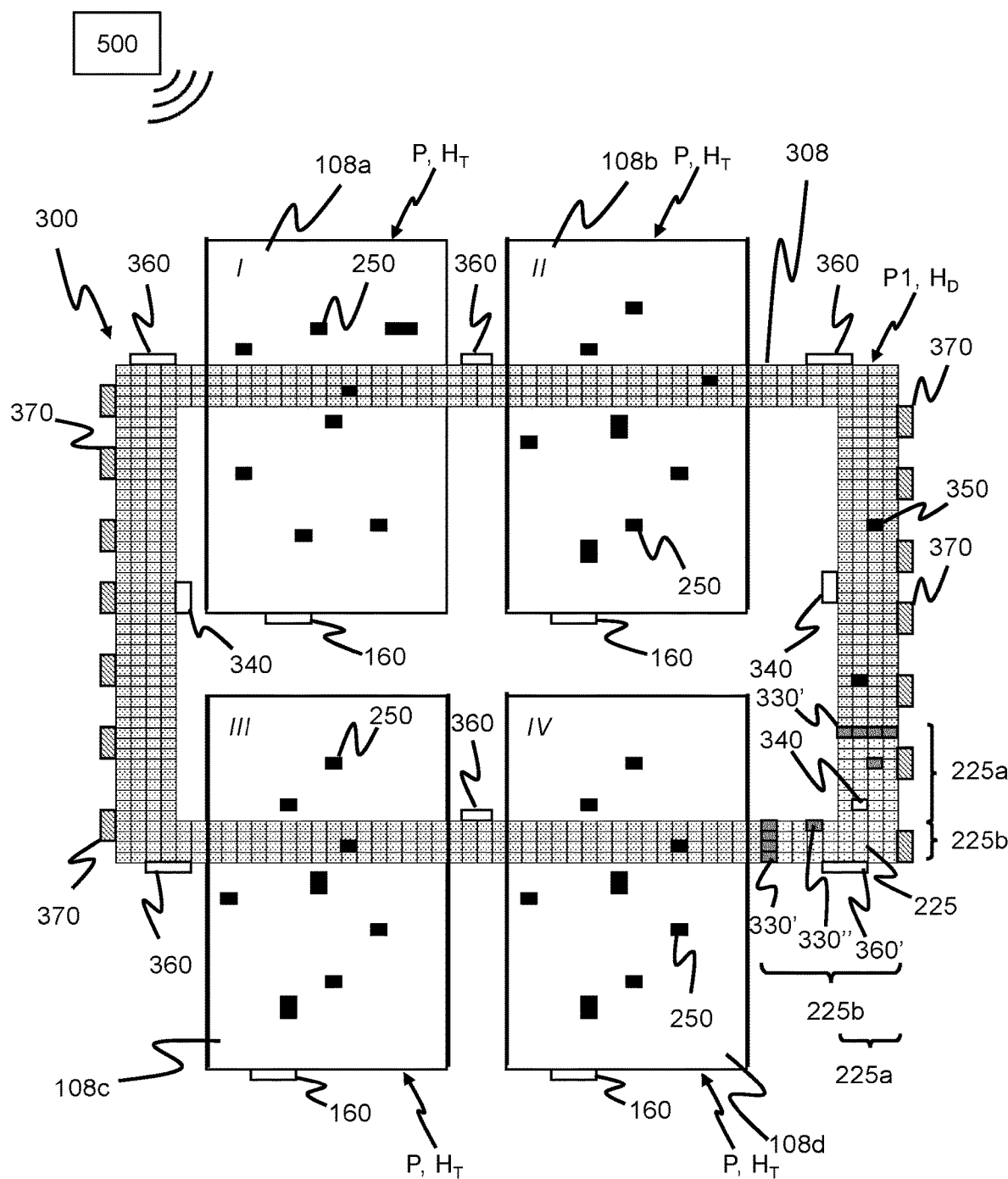
FIG. 9 is a schematic top view of an automated storage and retrieval system according to a third embodiment of the invention, where the system comprises a plurality of transport rail systems with container handling vehicles and one delivery rail system extending below all the transport rail systems.

FIG. 9 shows yet another embodiment of an automated storage and retrieval system 1. The system 1 includes four spaced apart transport rail systems 108a-d at an upper height HT, each with operative container handling vehicles 250, and a delivery rail system 308 at a lower height HD designed as a four cells wide path extending below all four of the transport rail systems 108a-d in a closed loop. As a result, any operative container delivery vehicle 350 may receive storage containers 106 from a storage column 105 belonging to any of the transport rail systems 108a-d.

At the outer periphery of the delivery rail system 308 several delivery ports 370 are arranged to receive (and possibly also deliver) storage containers 106 to the container delivery vehicles 350.

The outer periphery of the delivery rail system 308 also contains a number of gateways 360 distributed in the horizontal plane P1, where each gateway 360 is configured to allow entrance of a service vehicle 20 into the delivery rail system 308.

FIG. 9 shows a scenario where the control system 500 has
  detected a malfunctioning container delivery vehicle 340,
  instructed the malfunctioning vehicle 340 to halt,
  generated a shutdown zone 225 around the malfunctioning vehicle 340, wherein the shutdown zone comprises a malfunctioning vehicle zone 225a which includes the halt position of the malfunctioning vehicle 340 and an entrance zone for entry into the malfunctioning vehicle zone which includes one of the gateways 360',
  instructed eight of the operable container delivery vehicles 330' of the operative container delivery vehicles 350 to halt at the boundaries of the shutdown zone 225 to create a physical barrier for all the operative container delivery vehicles 350 located outside the shutdown zone 225 and
  instructed all others container delivery vehicles 330" located within the shutdown zone 225 to halt.

With the scenario depicted in FIG. 9, the service vehicle 20 may enter the gateway 360' and drive to the malfunctioning container delivery vehicle 340 with little or no risk of collision with other container delivery vehicles 350 still operative on the delivery rail system 308.

During the operation of one or more service vehicles other than the service vehicle operating on the delivery rail system may be operating on the transport rail system(s) 108 by use of the corresponding gateways 160.

Two possible configurations of a service vehicle 20 suitable for the operations described above are shown in FIG. 10A and FIG. 10B.

Both examples of service vehicles 20 comprise a seat 25 for the operator and a support base 22 for support of malfunctioning vehicles 240,340 and driving means 23 to enable movement of the service vehicle 20. The service vehicle 20 could of course comprise other configurations and the present invention is not limited to these two examples.

Figure 10:
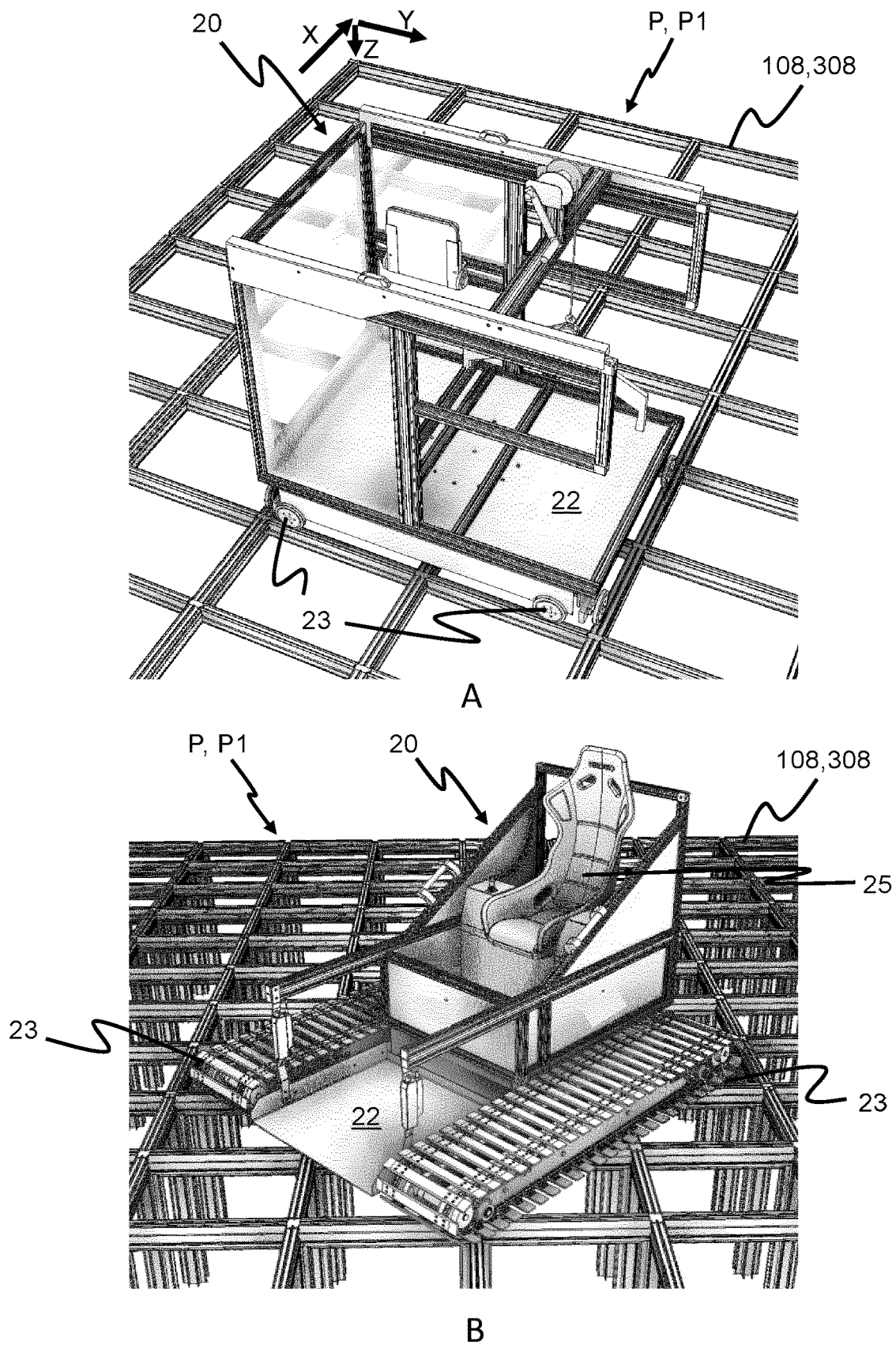
FIGS. 10A and 10B are perspective views of service vehicles suitable for operating on a rail system of an automated storage and retrieval system, where

In FIG. 10A the driving means 23 comprises two set of four wheels, where at least one of the sets may be raised and lowered. Hence, the driving means are similar to the driving means of the above described container handling vehicles 250 and container delivery vehicles 350. The wheels follow the rails 110,111,310,311 of the transport and/or delivery rail system(s) 108,308.

In FIG. 10B the driving means 23 of the service vehicle 20 comprises caterpillar tracks configured to drive on top of the rails 110,310,111,311, thereby allowing movement in any direction in the horizontal planes P,P1 of either the transport rail system 108 or the delivery rail system 308.

The service vehicle of FIG. 10B may be used as an alternative to, or in conjunction with, the service vehicle 20 of FIG. 10A.

Figure 11:
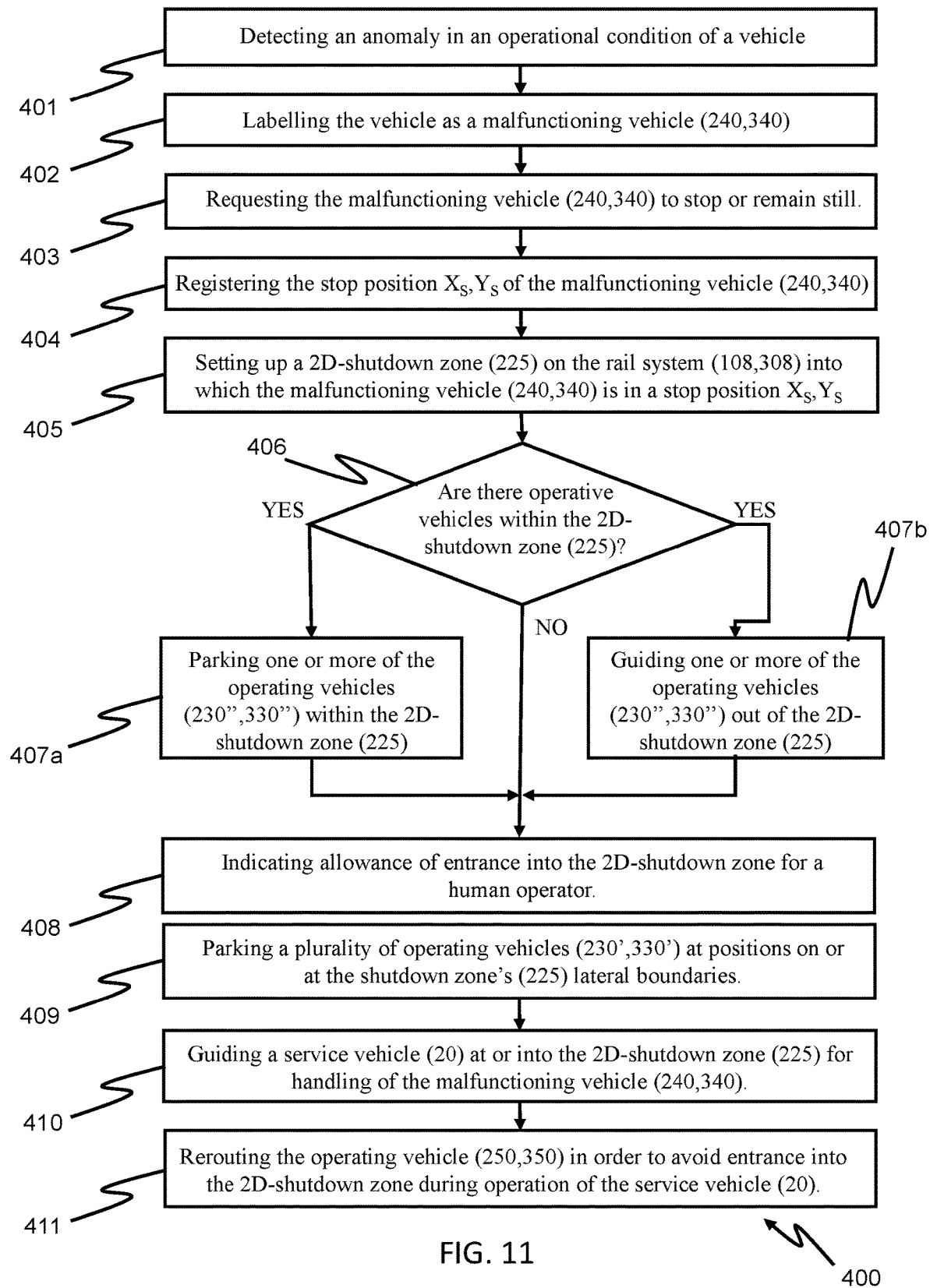
FIG. 11 is a flow chart describing an example of steps of a method according to the invention

A flow chart 400 describing one example of the inventive method is shown in FIG. 11 where the following method steps are executed/controlled by the control system 500:

401. An anomaly in one or more operation conditions of a remotely operated vehicle 250,350 intended to be operating on either the transport rail system 108 or the delivery rail system 308 is registered/detected. Examples of operation conditions are positional accuracy, acceleration pattern, deceleration pattern, speed during operations, raising and/or lowering of a lifting frame, temperature, charging efficiency of battery and contact with underlying rail system.
402. The vehicle having the anomaly is labelled as a malfunctioning vehicle 240,340.
403. The malfunctioning vehicle 240,340 is instructed to halt, either immediately or at a specific location on the rail system 108,308.
404. The stop position of the malfunctioning vehicle 240,340 is registered in the control system 500.
405. A shutdown zone 225 is created/set on the rail system 108,308, in which the malfunctioning vehicle 240,340 has been brought to a halt.
406. Are there any operative vehicles 250,350 within the shutdown zone 225?
407. If yes, either
    a. park one or more of the operating vehicles within the shutdown zone or
    b. guide one or more of the operating vehicles out of the shutdown zone, alternatively to a boundary of the shutdown zone 225 (see step 408), or
    c. a combination thereof,
    such that the shutdown zone 225 may become void of any operative vehicles 250,350.
408. Indicating allowance of entrance onto an entrance zone 225*b* of the shutdown zone 225 on the rail system via a gateway 160,360 for a human operator.
409. If not already completed in step 407*b*, one or more of the operating vehicles 230',330' are brought to a halt at positions on or at the lateral boundaries of the shutdown zone 225 in order to create a physical barrier which at least partly prevent other operating vehicles 250,350 to enter.
410. A service vehicle 20 is guided into the entrance zone 225*b* for entry into a malfunctioning vehicle zone 225*a* of the shutdown zone 225, where the malfunctioning vehicle zone 225*a* includes the halt position of the malfunctioning vehicle, thus allowing handling and/or maintenance of the malfunctioning vehicle 240,340.
411. The operating vehicle(s) 250,350 outside the shutdown zone is/are rerouted in order to avoid entry into the shutdown zone 225 during operation of the service vehicle 20.

This method will make it safe for an operator intending to walk by foot to the malfunctioning vehicle 240,340, i.e. to avoid using a service vehicle 20.

The plurality of remotely operated vehicles 250,350 may be arranged to create two lines of halted vehicles 230',330' at the boundary of the shutdown zone 225 extending, but not including the gateway 160,360. The distance between the two lines of vehicles 230',330' should be at least one cell 122,322 wide, for example three cells 122,322 wide.

In the preceding description, various aspects of the method and its related system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the method and the system, which are apparent to persons skilled in the art to which the disclosed subject matter pertains, are deemed to lie within the scope of the present invention.

LIST OF REFERENCE NUMERALS/LETTERS

1 Automated storage and retrieval system
20 Service vehicle
20' Human operator
22 Support base for malfunctioning vehicle
23 Driving means for the service vehicle
25 Seat for operator
100 Framework structure
102 Upright members of framework structure
103 Horizontal members of framework structure
104 Storage grid/three-dimensional grid
105 Storage column
106 Storage container
106' Storage container
107 Stack
108 Transport rail system/upper track system
108' Left/first transport rail system region
108" Mid/second transport rail system region
108''' Right/third transport rail system region
108*a* First transport rail system
108*b* Second transport rail system
108*c* Third transport rail system
108*d* Fourth transport rail system
109 Periphery of the transport rail system
110 First set of parallel rails in first direction (X) of a transport rail system
110*a* A rail of the first set of parallel rails 110
110*b* A rail of the first set of parallel rails 110
111 Second set of parallel rails in second direction (Y) of a transport rail system
111*a* A rail of the second set of parallel rails 111
111*b* A rail of the second set of parallel rails 111
119 Delivery column of transport rail system
120 Delivery column of transport rail system
122 Cell of transport rail system
125 Vehicle blocking barrier between transport rail system region
130*a* First passage for container handling vehicles
130*b* Second passage for container handling vehicles
160 Gateway to transport rail system for service vehicle
160*a* First gateway of the first transport rail system region
160*b* Second gateway of the second transport rail system region
160*c* Third gateway of the third transport rail system region
225 Shutdown zone
225*a* Malfunctioning vehicle zone
225*b* Entrance zone
230 Parked container handling vehicle
230' Boundary defining, parked container handling vehicle 230" Non-boundary defining, parked container handling vehicle
240 Malfunctioning container handling vehicle
250 Operable container handling vehicle
250a Vehicle body for container handling vehicle
250b First set of wheels of container handling vehicle
250c Second set of wheels of container handling vehicle
300 Delivery framework structure
308 Delivery rail system/delivery track system/lower track system
308' Left/first delivery rail system region
308" Mid/second delivery rail system region
308'" Right/third delivery rail system region
309 Periphery of delivery rail system
310 First set of parallel rails in first direction (X) on delivery rail system
310a A rail of the first set of parallel rails 310
310b A rail of the first set of parallel rails 310
311 Second set of parallel rails in second direction (Y) on delivery rail system
311a A rail of the second set of parallel rails 311
311b A rail of the second set of parallel rails 311
315 Grid opening in delivery rail system
322 Cell of delivery rail system
325 Vehicle blocking barrier on a delivery rail system
330 Parked container delivery vehicle
330' Boundary defining, parked container delivery vehicle
330" Non-boundary defining, parked container delivery vehicle
340 Malfunctioning container delivery vehicle
350 Operable container delivery vehicle
351 Wheel assembly for container delivery vehicle
352 Storage container support on the container delivery vehicle
360 Gateway to delivery rail system for service vehicle
360a First gateway of first delivery rail system region
360b Second gateway of second delivery rail system region
360c Third gateway of third delivery rail system region
360' Gateway to shutdown zone of delivery rail system for service vehicle
370 Delivery port for delivering storage containers by container delivery vehicles
380a First passage for container delivery vehicles
380b Second passage for container delivery vehicles
400 Flow chart for handling malfunctioning vehicles
401 Detecting an anomaly in an operational condition of a remotely operated vehicle
402 Labelling the remotely operated vehicle as a malfunctioning vehicle
403 Requesting the malfunctioning vehicle to stop or remain still
404 Registering the stop position of the malfunctioning vehicle
405 Setting up a shutdown zone on the rail system into which the malfunctioning vehicle is in a stop position
406 Presence of operative remotely operated vehicles within the shutdown zone?
407a Parking any operating remotely operated vehicles within the shutdown zone
407b Guiding any operating remotely operated vehicles out of the shutdown zone
408 Parking a plurality of operating remotely operated vehicles at positions on or at the shutdown zone's lateral boundaries
409 Guiding a service vehicle/human operator into the shutdown zone for handling of the malfunctioning vehicle
410 Rerouting the operating remotely operated vehicle in order to avoid collision with the service vehicle when located outside the shutdown zone
500 Control system
X First direction
Y Second direction
Z Third direction
P Horizontal plane of the transport rail system
P1 Horizontal plane of delivery rail system

The invention claimed is:

1. A method for handling malfunctioning vehicles on a track system constituting part of a storage and retrieval system configured to store a plurality of stacks of storage containers, wherein the storage and retrieval system comprises:
remotely operated vehicles configured to move laterally on the track system, and
a control system for monitoring and controlling wirelessly movements of the remotely operated vehicles, wherein the control system performs at least following steps by wireless data communication:
A. detecting an anomaly in an operational condition of a vehicle on the track system,
B. registering the vehicle with an anomalous operational condition as a malfunctioning vehicle,
C. registering a halt position of the malfunctioning vehicle relative to the track system,
D. setting up a two-dimensional shutdown zone on the track system comprising:
a malfunctioning vehicle zone including the halt position of the malfunctioning vehicle, and
an entrance zone for entry into the malfunctioning vehicle zone, the entrance zone extending between the malfunctioning vehicle zone and a location at a periphery of the track system,
E. ordering the remotely operated vehicles in operation within the shutdown zone to either move out of the shutdown zone, to halt, or to perform a combination thereof, and
F. indicating allowance of entry into the entrance zone for an external operator by at least one of:
unlocking a gateway at the periphery, and
producing an entry-allowed signal registrable by a human operator located at the periphery such that the human operator may enter the entrance zone through the gateway.

2. The method in accordance with claim 1, wherein each of the remotely operated vehicles comprises driving wheels, and wherein the control system is configured such that any transmission of a signal for turning back on a power supply to the driving wheels of a halted remotely operated vehicle within the shutdown zone must be executed with at least one physical intervention of the external operator.

3. The method in accordance with claim 1, wherein the method further comprises performing, after step E:
updating a movement pattern of any remotely operated vehicles in operation outside the shutdown zone during and after a time of setting up the shutdown zone such that entry into the shutdown zone is avoided.

4. The method in accordance with claim 1, wherein a service vehicle is guided to the malfunctioning vehicle via the entrance zone after step F.

5. The method in accordance with claim 4, wherein the service vehicle is guided from the gateway.

6. The method in accordance with claim 4, wherein the service vehicle comprises a caterpillar track configured to drive on top of the track system.

7. The method in accordance with claim 1, wherein the method further comprises after setting up the shutdown zone and before ordering the remotely operated vehicles in operation within the shutdown zone to either move out of the shutdown zone, to a halt or a combination thereof, comprises:
rerouting a first plurality of remotely operated vehicles selected from the remotely operated vehicles operating on the track system to a position located at an edge of the malfunctioning vehicle zone extending across tracks of the track system, and
transmitting one or more signals to the first plurality of remotely operated vehicles, bringing the first plurality of remotely operated vehicles to a halt thereby making a physical barrier using the first plurality of remotely operated vehicles.

8. The method in accordance with claim 7, wherein the method further comprises:
rerouting a second plurality of remotely operated vehicles selected from the remotely operated vehicles to a position located at an edge of the entrance zone extending across tracks of the track system, and
transmitting one or more signals to the second plurality of remotely operated vehicles, bringing the second plurality of remotely operated vehicles to a halt.

9. The method in accordance with claim 1, wherein the track system comprises:
a first track system region,
a second track system region forming the two-dimensional shutdown zone, and
a vehicle blocking barrier arranged between the first and the second track system regions, wherein the vehicle blocking barrier comprises a vehicle passage having a minimum lateral width in a horizontal plane allowing one of the remotely operated vehicles to move between the first track system region and the second track system region via the vehicle passage.

10. The method in accordance with claim 9, wherein the method further comprises:
rerouting at least one of the remotely operated vehicles other than the malfunctioning vehicle to a position within the vehicle passage, and
bringing the at least one of the remotely operated vehicles to a halt such that an entry into the second track system region is avoided.

11. The method in accordance with claim 1, wherein the track system is arranged on a rail system comprising a first set of parallel rails arranged in a horizontal plane and extending in a first direction and a second set of parallel rails arranged in the horizontal plane and extending in a second direction which is orthogonal to the first direction, the first and second sets of parallel rails forming a grid pattern in the horizontal plane comprising a plurality of adjacent cells, each comprising a grid opening defined by a pair of adjacent rails of the first set of parallel rails and a pair of adjacent rails of the second set of parallel rails, wherein the remotely operated vehicles are arranged to move laterally on the rail system.

12. The method in accordance with claim 1, wherein the storage and retrieval system comprises:
an upper track system arranged on a transport rail system at an upper height on which a plurality of remotely operated container handling vehicles are configured to move laterally, and
a lower track system being a delivery track system at a lower height less than the upper height on which a plurality of remotely operated container delivery vehicles are configured to move laterally and to receive storage containers from higher located container handling vehicles, wherein the method steps B-F are performed:
for the plurality of remotely operated container handling vehicles in a case where the control system registers an anomaly in an operational condition of a container handling vehicle from the plurality of remotely operated container handling vehicles, and/or
for the plurality of remotely operated container delivery vehicles in a case where the control system registers an anomaly in an operational condition of a container delivery vehicle from the plurality of remotely operated container delivery vehicles.

13. The method in accordance with claim 12, wherein each of the plurality of remotely operated container handling vehicles is configured:
to lift the storage containers stacked in stacks through a grid opening using a lifting device,
to move the storage containers to other locations on the transport rail system, and
to lower the storage containers down to the delivery track system using the lifting device.

14. The method in accordance with claim 12, wherein each of the plurality of remotely operated container delivery vehicles comprises:
a set of wheels configured to move each of the plurality of remotely operated container delivery vehicles along tracks of the delivery track system,
a drive motor configured to provide rotational power to the set of wheels, and
a container carrier configured to receive a storage container from above and onto the container carrier.

15. The method in accordance with claim 12, wherein the storage and retrieval system comprises a plurality of laterally spaced apart transport rail system modules onto which the plurality of remotely operated container handling vehicles are moving, and wherein the delivery track system is configured such that one of the plurality of remotely operated container delivery vehicles is allowed to move below all or more than one of the plurality of laterally spaced apart transport rail system modules during normal operation.

16. The method in accordance with claim 12, wherein the method further comprises:
rerouting the plurality of remotely operated container delivery vehicles away from a two-dimensional zone projected down to the delivery track system from the two-dimensional shutdown zone set up on the transport rail system.

17. The method in accordance with claim 1, wherein the track system forms a grid pattern of adjacent cells, and wherein each of the remotely operated vehicles comprises driving wheels.

18. An automated storage and retrieval system operating to handle malfunctioning vehicles by a method for handling malfunctioning vehicles on a track system constituting part of a storage and retrieval system configured to store a plurality of stacks of storage containers, wherein the storage and retrieval system comprises:
remotely operated vehicles configured to move laterally on the track system, and
a control system for monitoring and controlling wirelessly movements of the remotely operated vehicles, wherein the control system performs at least following steps by wireless data communication:
A. detecting an anomaly in an operational condition of a vehicle on the track system,
B. registering the vehicle with an anomalous operational condition as a malfunctioning vehicle,
C. registering a halt position of the malfunctioning vehicle relative to the supporting track system,
D. setting up a two-dimensional shutdown zone on the track system comprising:
a malfunctioning vehicle zone including the halt position of the malfunctioning vehicle, and
an entrance zone for entry into the malfunctioning vehicle zone, the entrance zone extending between the malfunctioning vehicle zone and a location at a periphery of the track system,
E. ordering the remotely operated vehicles in operation within the shutdown zone to either move out of the shutdown zone, a halt or a combination thereof, and
F. indicating allowance of entry into the entrance zone for an external operator by at least one of:
unlocking a gateway at the periphery, and
producing an entry-allowed signal registrable by a human operator located at the periphery such that the human operator may enter the entrance zone through the gateway.

19. The automated storage and retrieval system in accordance with claim 18, wherein the track system forms a grid pattern of adjacent cells, and wherein each of the remotely operated vehicles comprises driving wheels.

20. A control system comprising a computer program that, when executed on a processor of the control system, is configured to perform a method for handling malfunctioning vehicles on a track system constituting part of a storage and retrieval system configured to store a plurality of stacks of storage containers, wherein the storage and retrieval system comprises:

remotely operated vehicles configured to move laterally on the track system, and
a control system for monitoring and controlling wirelessly movements of the remotely operated vehicles, wherein the control system performs at least following steps by wireless data communication:
A. detecting an anomaly in an operational condition of a vehicle on the track system,
B. registering the vehicle with an anomalous operational condition as a malfunctioning vehicle,
C. registering a halt position of the malfunctioning vehicle relative to the track system,
D. setting up a two-dimensional shutdown zone on the track system comprising:
a malfunctioning vehicle zone including the halt position of the malfunctioning vehicle, and
an entrance zone for entry into the malfunctioning vehicle zone, the entrance zone extending between the malfunctioning vehicle zone and a location at a periphery of the track system,
E. ordering the remotely operated vehicles in operation within the shutdown zone to either move out of the shutdown zone, a halt or a combination thereof, and
F. indicating allowance of entry into the entrance zone for an external operator by at least one of:
unlocking a gateway at the periphery, and
producing an entry-allowed signal registrable by a human operator located at the periphery such that the human operator may enter the entrance zone through the gateway.

21. The control system in accordance with claim 20, wherein the track system forms a grid pattern of adjacent cells, and wherein each of the remotely operated vehicles comprises driving wheels.

* * * * *